36-129 AU 353 EX

FIP8307 OR RE 26,340

BEST AVAILABLE COPY

55266

Feb. 6, 1968

A. DASSLER

Re. 26,340

3224117

SPORT SHOES, ESPECIALLY FOR RUNNERS

Original Filed Sept. 15, 1964

INVENTOR:

ADOLF DASSLER

BY Spencer & Kaye

ATTORNEYS

United States Patent Office

Re. 26,340
Reissued Feb. 6, 1968

26,340
SPORT SHOES, ESPECIALLY FOR RUNNERS

Adolf Dassler, Am Bahnhof, Herzogenaurach, near Nuremberg, Germany

Original No. 3,224,117, dated Dec. 21, 1965, Ser. No. 396,555, Sept. 15, 1964. Application for reissue Apr. 28, 1966, Ser. No. 552,666
9 Claims. (Cl. 36—2.5)

Matter enclosed in heavy brackets [ ] appears in the original patent but forms no part of this reissue specification; matter printed in italics indicates the additions made by reissue.

The present invention relates to sport shoes and more particularly to running or track shoes.

Nowadays such sport shoes are usually made of relatively thin leather so as to make them of the lowest possible weight. This is especially important for running and track shoes where even a fraction of an ounce of excessive weight which the runner has to carry may affect the results of his effort. For this reason, the uppers of such shoes are nowadays preferably made of kangaroo leather which is very thin (0.5 to 0.8 mm.) and also very tough. Sport shoes which are made from this material therefore retain their proper shape for a long time despite hard usage. Other kinds of leather which may be used for this purpose are, for example, box calf and goat skin, although sport shoes which are made from these kinds of leather are inferior to those of kangaroo leather which has a tensile strength far superior to that of any other kind of leather.

It is a fact well known in the art that the necessary operations of working such a thin leather so as to form the uppers of sport shoes can only be carried out with considerable difficulties. These difficulties are primarily due to the fact that it is very difficult or even impossible to roughen a leather of a thickness of less than 1 mm. without danger that the leather might thereby be weakened so much that it may tear when it is subsequently subjected to high stresses to which the uppers of sport shoes are often subjected. In this connection, it must be kept in mind that the tensile strength of leather depends primarily upon its grain layer, that is, the layer which is removed by the roughening process.

Since in most sport shoes the grain side of the upper faces outwardly and this outer side is generally treated with a colored dressing which resists glueing, it was absolutely necessary prior to this invention to roughen the marginal part of the upper which is lasted around the insole in order to remove this glue-resistant dressing so as to insure that the outer sole could be securely glued to this part of the upper. If the leather of the upper has, however, a thickness of less than 1 mm., it is obvious that a further reduction of this thickness by roughening the leather may easily lead to the difficulties as above described.

Furthermore, since the leather of sport shoes and especially of running shoes is frequently dyed in a white color, it is hard to distinguish the roughened parts of the leather from the remainder and therefore almost impossible to determine in each case exactly the proper extent which these marginal parts of the upper may or should be roughened. The difficulties which are caused by roughening thin leather are especially serious when working with kangaroo leather since it is very thin and its grain side is generally treated with a very strong colored dressing in order to cover up unsightly scars, fissures and other flaws. Such a dressing leads to stiffening of the leather which also increases its tendency to tear. In the course of time this colored dressing becomes so brittle as to develop cracks which collect dirt and render the shoes unsightly. Since the application of a strong covering dressing also requires the leather to have a high fat content, such a leather becomes relatively heavy. This, of course, is contrary to the desire to attain a very light sport shoe.

It is an object of the present invention to overcome the mentioned difficulties which occur when using leather of a thickness of less than 1 mm., and especially kangaroo leather, for producing the uppers of sport shoes. According to the invention this object may be attained by reversing the usual procedure and turning the flesh side of the leather toward the outside. The flesh side which therefore forms the outside of the upper is provided according to the invention with a waterproofing and water-repellent impregnation, for example, on a silicon base.

The most important advantage of the invention is the fact that the normally rough surface of the flesh side of the leather permits the inwardly tucked part of the upper to be securely glued to the outer sole. Thus, there is no longer any need to roughen the leather and all of the difficulties which are due to its thinness are eliminated. The new method has the further advantage that, since the surface of the flesh side of kangaroo leather has a very uniform texture, there is no need to apply a covering dressing thereon. Consequently, there is no glue-resistant layer which might interfere with a proper glueing between the inwardly tucked part of the upper and the outer sole. Furthermore, since the rather complicated roughening operation is now omitted, the cost of manufacture of the sport shoes is considerably reduced.

The waterproof and water-repellent impregnation which is provided on the rough flesh side of the leather adheres to the latter so well that it is no longer necessary to impregnate the leather throughout. The impregnation may consist of a thin protective coating which may be applied upon the flesh side, for example, by spraying so that the weight of the upper will hardly be increased. In a similar manner it is possible to apply and secure other coatings to the surface of the flesh side, for example, for protecting particular parts of the upper, such as the ball area, from damage. The weight of the upper will now in any case be lower than that of the conventional sport shoes in which because of the low adhesiveness of the coatings on the grain side of the leather, such coatings always had to be provided in the form of an impregnation which permeated substantially the entire thickness of the leather. Colored coatings may, if desired, also be applied to the sport shoes according to the invention at a lower increase in weight. Such colored coatings may consist of transparent aniline dyes since it is no longer necessary to cover up flaws such as are often present on the grain side of the leather. The outer side of the new sport shoes may therefore be improved in many more and different ways than by those which could previously be employed. Thus, for example, it is now possible to provide the surface of certain parts of the upper with stiffening coatings for preventing these parts from expanding. If the coatings consist of plastic, for example, sheet plastic, these coatings may be welded upon the flesh side of the leather. They may be employed, for example, in the form of strips or straps to take up forces which tend to expand the upper in the longitudinal or transverse direction. In previous sport shoes, such so-called tension straps always had to be sewed upon the upper since it was impossible to weld them upon the grain side. Such sewed-on tension straps and the like may therefore now be omitted.

The present invention therefore permits the manufacture of very durable sport shoes with uppers made of very thin leather and with outer soles which can not become as easily separated from the uppers as those of the conventional sport shoes in which the grain side of the leather faces outwardly.

The durability of the sport shoes according to the invention is further improved by the fact that the seams which are provided on the uppers either for connecting the individual parts of the upper to each other or for securing additional elements, for example, tension straps or the like, to the outer side of the upper, can be impressed so deeply into the flesh side of the leather that there is a much lower possibility that these seams may be worn or damaged than when they are provided on the grain side of the leather.

The features and advantages of the present invention will become further apparent from the following description of a running or track shoe which is illustrated in the accompanying drawings, in which:

FIGURE 1 shows a perspective side view of the shoe, while

Figure 1:
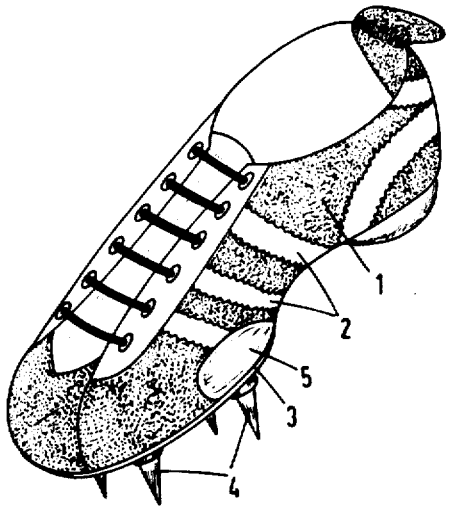
Figure 2:
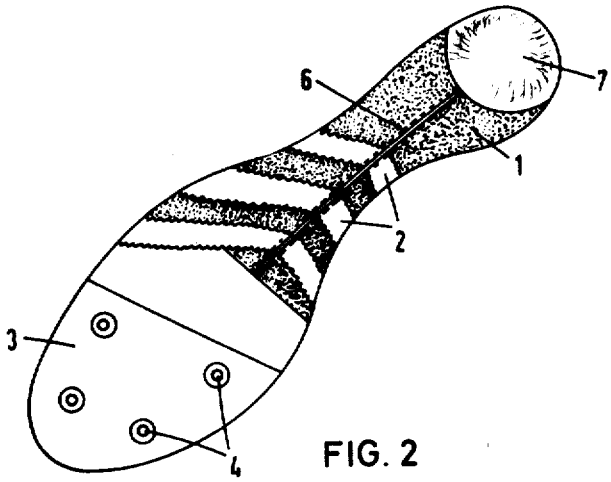
FIGURE 2 shows a bottom view thereof.

In these drawings, the outer side of the upper 1 of the running or track shoe is formed by the rough flesh side of the leather which has a thickness of less than 1 mm. The grain side of the leather therefore faces inwardly toward the foot.

The ball and instep parts of the shoe are provided with tension straps 2 which extend from the laced opening to the sole and around the same and are intended to prevent the upper from expanding transversely to the surface of the sole. These straps 2 consist of plastic and are welded to the flesh side of the upper 1 which in the particular shoe as illustrated also encloses the foot at the bottom side thereof from the ball portion up to the heel where the two sides of the upper are secured to each other by a seam 6. A running sole 3 in the form of a half sole is provided only on the front part of the shoe for holding the spikes 4, and the heel part is covered by a small patch 7 of a suitable wear-resistant material which is glued upon the upper.

Within the ball area of the shoe a coating 5 is sprayed upon the flesh side of the leather. This coating 5 is provided for protecting this exposed part of the upper from being worn prematurely, i.e., the coating reinforces or stiffens the leather to prevent the wearing through of the leather at the points of greatest stress, such as the ball area of the shoe. The coating also prevents the shoe from expanding and thereby maintains the proper shape for the shoe. The coatings may be plastic solutions which may be applied by spraying or may be in the form of prefabricated parts, e.g. straps, which may be welded to the leather.

Although my invention has been illustrated and described with reference to the preferred embodiment thereof, I wish to have it understood that it is in no way limited to the details of such embodiment, but is capable of numerous modifications within the scope of the appended claims.

Having thus fully disclosed my invention, what I claim is:

1. A [sport] *track* shoe having an upper consisting of a leather of less than 1 mm. thickness having a grain side and a flesh side, the flesh side of the leather of [said] *the entire* upper facing outwardly, and at least one coating on said flesh side, said coating forming a waterproofing impregnation.

2. [sport] *track* shoe as defined in claim 1 wherein said upper consists of kangaroo leather.

3. A [sport] *track* shoe as defined in claim 1, wherein said coating upon said flesh side is a sprayed coating.

4. A [sport] *track* shoe as defined in claim 1, further comprising an additional coating upon those parts of the flesh side of said upper which are especially exposed to strong wear for reinforcing said parts.

5. A [sport] *track* shoe as defined in claim 1, further comprising an additional coating upon those parts of the flesh side of said upper which are especially subjected to undesired expansion for stiffening said parts.

6. A [sport] *track* shoe as defined in claim 1, further comprising tension straps of plastic, and means forming a weld joint between said straps and the flesh side of said upper.

*7. A track shoe having a sole provided with means for securing spikes and an upper consisting of a leather of less than 1 mm. thickness having a grain side and a flesh side, the flesh side of the leather of the entire upper facing outwardly.*

*8. A track shoe as defined in claim 7 wherein said upper consists of kangaroo leather.*

*9. A track shoe as defined in claim 7, further comprising tension straps of plastic, and means forming a weld joint between said straps and the flesh side of said upper.*

References Cited

The following references, cited by the Examiner, are of record in the patented file of this patent or the original patent.

UNITED STATES PATENTS

| | | | |
|---|---|---|---|
| 1,618,637 | 2/1927 | Bowe | 36—26 X |
| 2,439,493 | 4/1948 | Smith | 36—26 X |
| 2,773,316 | 12/1956 | Clappier | 36—113 |
| 3,138,880 | 6/1964 | Kunzli | 36—2.5 |
| 3,187,703 | 6/1965 | Fake | 112—262 X |

FOREIGN PATENTS

| | | |
|---|---|---|
| 605,695 | 9/1960 | Canada. |
| 878,007 | 6/1953 | Germany. |
| 879,965 | 6/1953 | Germany. |

OTHER REFERENCES

The Shoe and Leather Lexicon, 6th edition, page 44, by Boot and Shoe Recorder Publishing Co., 1930.

The Leather Worker's Handbook, published by Vernon Lock Ltd., London, England, 1963, pages 194–195.

The Shoe Salesman's Manual, 1936, published by The Gill Publications, Inc., page 21.

PATRICK D. LAWSON, *Primary Examiner.*